United States Patent
Henry

(10) Patent No.: US 9,475,258 B2
(45) Date of Patent: Oct. 25, 2016

(54) MULTIPLE-RESIN COMPOSITE STRUCTURES AND METHODS OF PRODUCING THE SAME

(75) Inventor: Christopher P. Henry, Thousand Oaks, CA (US)

(73) Assignee: The Boeing Company, Chicago, IL (US)

(*) Notice: Subject to any disclaimer, the term of this patent is extended or adjusted under 35 U.S.C. 154(b) by 564 days.

(21) Appl. No.: 13/524,224

(22) Filed: Jun. 15, 2012

(65) Prior Publication Data

US 2014/0205793 A1 Jul. 24, 2014

(51) Int. Cl.
| | | |
|---|---|---|
| *B32B 5/12* | (2006.01) | |
| *D06M 15/01* | (2006.01) | |
| *D06M 15/55* | (2006.01) | |
| *B29B 15/10* | (2006.01) | |
| *B64C 1/12* | (2006.01) | |
| *D06M 15/643* | (2006.01) | |
| *D06M 17/00* | (2006.01) | |
| *B29K 63/00* | (2006.01) | |
| *B29K 83/00* | (2006.01) | |

(52) U.S. Cl.
CPC ............... *B32B 5/12* (2013.01); *B29B 15/10* (2013.01); *B64C 1/12* (2013.01); *D06M 15/55* (2013.01); *D06M 15/643* (2013.01); *D06M 17/00* (2013.01); *B29K 2063/00* (2013.01); *B29K 2083/00* (2013.01); *Y10T 156/10* (2015.01); *Y10T 428/2481* (2015.01); *Y10T 428/24107* (2015.01); *Y10T 428/24983* (2015.01); *Y10T 442/2098* (2015.04); *Y10T 442/3301* (2015.04)

(58) Field of Classification Search
CPC ........ B32B 5/12; B32B 5/024; D06M 15/55; D06M 15/643
USPC ......... 428/306.6, 398, 111, 196; 442/60, 64, 442/71, 189, 308, 334, 339, 218; 422/71
See application file for complete search history.

(56) References Cited

U.S. PATENT DOCUMENTS

| | | | |
|---|---|---|---|
| 4,079,168 A | | 3/1978 | Schwemmer |
| 4,103,055 A | * | 7/1978 | Levy .............................. 428/113 |
| 5,360,669 A | * | 11/1994 | Noland et al. ................. 428/408 |
| 6,048,488 A | * | 4/2000 | Fink ........................ B29C 70/08 |
| | | | 264/102 |

(Continued)

OTHER PUBLICATIONS

Fink et al., "Co-Injection Resin Transfer Molding for Optimization of Integral Armor," Proceedings of Army Science Conference, Norfolk, VA, Jun. 15-17, 1998.

*Primary Examiner* — Maria Veronica Ewald
*Assistant Examiner* — Joanna Pleszczynska
(74) *Attorney, Agent, or Firm* — DASCENZO Intellectual Property Law, P.C.

(57) ABSTRACT

Solid, flexible composite structures may include a textile arrangement of at least one textile layer constructed of textile fibers and having a distribution of pores formed therein, with a first resin filling pores having a pore diameter equal to or less than a pore diameter threshold, and a second resin bonded to the first resin and substantially filling pores having a pore diameter greater than the pore diameter threshold. Some embodiments include a rigid first resin such as an epoxy, and a flexible second resin such as a silicone. Methods of producing composite structures may include selectively filling, in a textile layer having a number of pores formed therein, only those pores having a pore diameter equal to or less than a pore diameter threshold, with a first resin, and substantially filling the remaining pores in the textile layer with a second resin.

16 Claims, 4 Drawing Sheets

(56) References Cited

U.S. PATENT DOCUMENTS

| | | | |
|---|---|---|---|
| 6,200,915 B1* | 3/2001 | Adams et al. | 442/157 |
| 6,638,466 B1 | 10/2003 | Abbott | |
| 7,138,345 B2 | 11/2006 | Wadahara et al. | |
| 7,919,150 B2 | 4/2011 | Morita | |
| 2008/0255321 A1 | 10/2008 | Nakashima | |
| 2009/0029617 A1* | 1/2009 | Akimori et al. | 442/208 |
| 2010/0075101 A1 | 3/2010 | Tang | |

* cited by examiner

MULTIPLE-RESIN COMPOSITE STRUCTURES AND METHODS OF PRODUCING THE SAME

FIELD

The present disclosure relates to composite structures, and more particularly to composite structures having a textile arrangement and two (or more) resins.

BACKGROUND

One goal in designing vehicles, especially aero-structures of airplanes and other aircraft, is to reduce unwanted drag. An aircraft, or portions thereof, may be configured to have an aerodynamic shape, but drag also may be addressed by reducing exterior surface discontinuities such as seams between joined sections, joints (such as hinges, etc.) between fixed and moving control surfaces, and so forth. Such discontinuities not only represent potential sources of vortex-induced drag, but also may create or increase the acoustic signature of the aircraft, and/or other signatures including optical, radio frequency (RF), electrical, and so forth.

Some proposed measures focus on closing gaps between fixed and moving control surfaces with moveable structure such as sliding plates, but this adds mechanical complexity. Alternatively, such discontinuities may be sealed, such as by covering and/or forming the aircraft skin with a flexible material, but many flexible materials lack the appropriate shear strength to withstand the forces that are typically applied to an aircraft skin. Composite materials may have suitable mechanical properties, as well as generally high strength-to-weight ratios as compared to other structural materials, such as metal. However, once formed, many composites are too rigid and/or brittle to cover or close a gap between a fixed and a moving surface.

There is therefore a need for materials suitably flexible to cover or form an aircraft skin and having the mechanical stability appropriate to the forces typically applied thereto.

SUMMARY

The present disclosure describes several example embodiments of multiple-resin composite structures, and example methods of forming the composite structures.

In example composite structures according to the present disclosure, a textile arrangement of at least one textile layer constructed of textile fibers has a distribution of pores therein. The distribution of pores may include a number of intra-fiber pores within individual textile fibers and a number of inter-fiber pores between textile fibers. In such example composite structures, a first resin fills the intra-fiber pores and also those inter-fiber pores having a pore diameter equal to or less than a pore diameter threshold, and a second resin bonds to the first resin and substantially fills those inter-fiber pores having a pore diameter greater than the pore diameter threshold.

In some of such example embodiments, the first resin is more rigid than the second resin. For example, in such embodiments, the first resin may have an elastic modulus greater than approximately 1 GPa, and the second resin may have an elastic modulus less than approximately 1 GPa. For example, the first resin may include an epoxy, whereas the second resin may include a silicone.

In some of such example embodiments, at least one textile layer includes one or more fiber-rich regions within which all of the inter-fiber pores have a pore diameter equal to or less than the pore diameter threshold, and also includes one or more fiber-poor regions within which some of the inter-fiber pores have a pore diameter equal to or less than the pore diameter threshold and some have a pore diameter greater than the pore diameter threshold. In such embodiments, the fiber-rich regions are interspersed with the fiber-poor regions, such as in a pattern. In some of such embodiments, the textile arrangement includes two or more stacked textile layers, with a fiber-rich region of at least one textile layer superposed by one or more fiber-poor regions of at least one other textile layer, in a direction substantially orthogonal to the layers. The stacked textile layers may be at least partially bonded to each other by the first and/or second resins.

Example methods of forming the composite structures according to the present disclosure may include selectively filling, in a textile layer having a number of pores formed therein, only those pores having a pore diameter equal to or less than a pore diameter threshold, with the first resin, and substantially filling the remaining pores in the textile with the second resin.

In some of such methods, selectively filling with the first resin includes non-selectively applying the resin, such as in liquid form, such as by dipping. In such methods, the first resin may have a wetting threshold with respect to the textile fibers that is predicted to limit the first resin to fill only those pores with pore diameters equal to or less than the pore diameter threshold. Some example methods may include preparing the first resin for bonding with the second resin, such as through the use of a compatibilizing agent.

Some example methods may include stacking two or more textile layers, such as prior to applying the first resin. The stacking may include positioning stacked textile layers relative to each other in a desired manner, such as by superposing a fiber-rich region in one layer, partially or completely, with one or more fiber-poor regions in at least one other layer.

Some example methods may include forming the textile layer, for example by weaving the textile fibers, such as in a manner to intersperse fiber-poor regions with fiber-rich regions in a desired arrangement. In such methods, the arrangement may be irregular, or in a pattern. Methods that involve stacking textile layers may include positioning adjacent layers to arrange the relative distributions of fiber-rich and fiber-poor regions in a desired manner, such as to superpose a fiber-poor region with one or more fiber-rich regions in a direction orthogonal to the stacked layers.

The features, functions, steps, and processes summarized above may be achieved independently in various embodiments and/or methods, or may be combined in yet other embodiments and/or methods, further details of which are explained with reference to the following description and drawings.

DESCRIPTION

Figure 1:
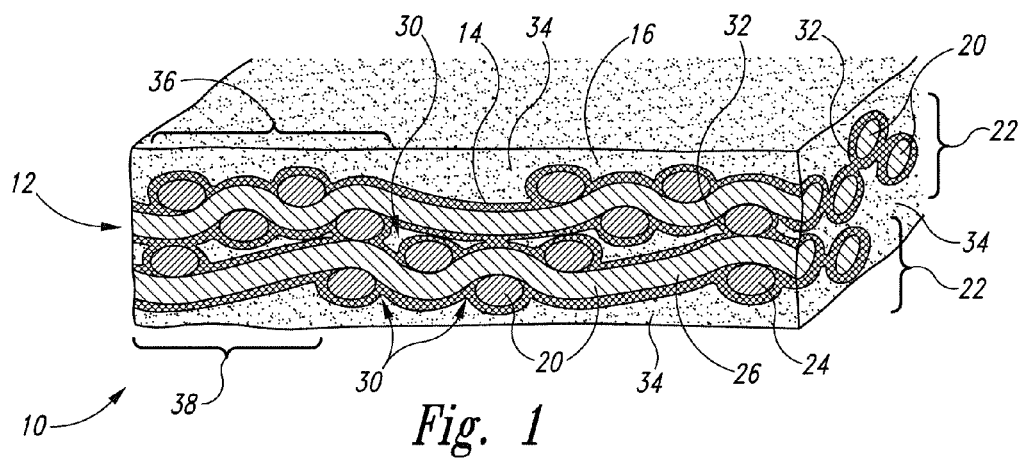
FIG. 1 is a partially schematic, oblique view showing an example embodiment of a composite structure according to the present disclosure, with a textile arrangement formed of textile fibers, a first resin filling some of the pores between the textile fibers, and a second resin filling the remaining pores between the textile fibers.

In general, example composite structures according to the present disclosure include a textile arrangement having a distribution of pores (or spaces, or voids) therein, with a first resin filling the smaller pores and a second resin filling the larger pores. The first and second resins may have different mechanical properties—for example the first resin may be rigid, whereas the second may be elastic (or less rigid than the first resin)—and thus impart these properties to portions of the textile arrangement infiltrated by the respective resins. Some textile arrangements may have a distribution of pore sizes such that the composite structure includes regions mostly filled with the first resin (such as in which the textile fibers are arranged densely) interspersed with regions mostly filled with the second resin (such as in which the textile fibers are more spaced apart). As such, depending on the geometry of the textile arrangement, the composite structure may be non-porous and selectively deformable, while offering mechanical properties such as shear strength.

In particular example embodiments, composite structures may include a textile layer constructed of textile fibers, a first resin, and a second resin, in which the first resin interconnects portions of the textile fibers that are spaced apart from each other by a distance equal to or less than a predetermined distance, and the second resin interconnects portions of the textile fibers that are spaced apart from each other by a distance greater than the predetermined distance. In such embodiments, the second resin may also interconnect portions of the first resin that are spaced apart by a distance greater than the predetermined distance. In such embodiments, the textile fibers may include intra-fiber spaces within the textile fibers that are also filled with the first resin.

The variably spaced relationship between, among, and within the textile fibers forming the textile layer may be thought of as defining a distribution of pores, or voids, or spaces, throughout the textile layer. Pores between textile fibers may be described as "inter-fiber" pores, and may be characterized as having a pore diameter that may correspond to the distance between the fibers forming the pore. Pores within textile fibers may be described as "intra-fiber" pores, and may also be characterized as having a pore diameter corresponding to a dimension of the intra-fiber space. As such, the pore diameter may vary throughout a pore, for example if the pore is irregularly shaped (such as depending on the arrangement and/or composition of the textile fibers).

Thought of in this manner, particular example embodiments of composite structures according to the present disclosure may include a textile layer constructed of textile fibers and having a distribution of pores formed therein, such as between, among, and within the textile fibers. In such embodiments, a first resin fills the pores having a pore diameter equal to or lower than a pore diameter threshold, and a second resin substantially fills the pores having a pore diameter greater than a pore diameter threshold. In some embodiments, the first resin may be comparatively rigid, whereas the second may be comparatively flexible. In some embodiments, the second resin does not fill any pores having a pore diameter lower than the threshold. In some embodiments, the second resin is bonded to the first resin.

In some of the example embodiments described above, the textile layer may be constructed to include a plurality of fiber-rich or fiber-dense regions, which may be described as regions within which all of the textile fibers are spaced apart from each other by a distance equal to or less than the predetermined distance, or alternatively regions within which all of the pores have a pore diameter equal to or less than the pore diameter threshold. The fiber-rich regions may be interspersed with fiber-poor regions, which may be thought of as "regions that are not fiber-rich," or regions within which some fibers, or portions thereof, are spaced apart by a distance equal to or less than the predetermined distance, and some are spaced apart by a distance greater than the predetermined distance. Alternatively, the fiber-poor regions may be described as regions in which some pores have a pore diameter equal to or less than the pore diameter threshold and some have a pore diameter greater than the pore diameter threshold.

In such embodiments, the fiber-poor and fiber-rich regions may be irregularly interspersed, or regularly interspersed, such as in a pattern. An example pattern may be a mesh-like pattern, wherein one or more regularly spaced-apart fiber-poor regions may each be surrounded by a fiber-rich region that may be continuous throughout the textile layer. Another example pattern may be a tile-like pattern, wherein one or more regularly spaced-apart fiber-rich regions are each surrounded by a fiber-poor region that may be continuous throughout the textile layer.

Optionally, the textile arrangement may include two or more stacked textile layers interconnected by one or both resins, such as depending on the distances between textile fibers of adjacent stacked textile layers (or, alternatively, the pore diameters of the pores between textile layers). The textile layers may be of dissimilar or similar configurations. In some embodiments, the textile layers may be stacked in such a manner that a fiber-poor region in one textile layer may be superposed (and in some cases, completely superposed) by one or more fiber-rich regions of one or more other textile layers, in a direction orthogonal to the stacked layers.

In some example embodiments, the first resin is, or includes, a rigid thermoset such as an epoxy or a phenolic resin. In some example embodiments, the second resin is, or includes, an elastomer such as silicone. In some example embodiments, the textile fibers are, or include, one or more of polyester, polyurethane, and polyethylene. In other embodiments, the textile fibers are, or include, glass, carbon fiber, metal alloys and/or engineering thermoplastics.

One or more of the composite structures disclosed herein may be incorporated into a structural, exterior, or interior element of a vehicle, or part or portion thereof. As such, some example embodiments include such an element, formed of any of the example composite structures disclosed herein. In some of such embodiments, the vehicle is an aero-structure such as an airplane or other aircraft, a spacecraft, a missile, and so forth. In some of such embodiments, the element is an exterior element such as an aircraft skin or a portion thereof.

The example embodiments of multiple-resin composite structures disclosed and illustrated herein may find application in various aspects of vehicle design, including (but not limited to) continuous aerodynamic skins for aircraft, for example to be applied to or otherwise incorporated into semi-structural regions between fixed structures, or surfaces, and control structures, or surfaces. As explained in greater detail herein, composite structures in accordance with the present disclosure may include two types of matrix resins having different material properties infiltrating two types of regions in a textile arrangement. In an illustrative, non-limiting example, a comparatively rigid resin fills only small pores in fiber-rich regions of each textile layer, thereby creating rigid regions throughout the textile arrangement. In this example, a comparatively flexible resin fills the fiber-poor regions between and among the rigid fiber-rich regions, resulting in a solid (i.e. substantially or completely non-porous) composite structure that maintains an elastic (i.e., stretchable, flexible, and/or otherwise deformable) character, while offering mechanical properties such as shear strength.

The geometry of the textile layers of the textile arrangement, such as the configuration of the fiber-rich regions relative to the fiber-poor regions, as well as the manner in which the textile layers are positioned relative to each other in a textile arrangement that includes a plurality of stacked textile layers, may enhance or limit one or more of the aforementioned properties, such as to create a composite structure suitable for a particular application in aero-structure or other non-aero structures.

The present disclosure also provides example methods by which the composite structures may be produced.

Turning now to FIGS. 1-5, illustrative non-exclusive examples of composite structures and components thereof are illustrated. Where appropriate, the reference numerals from the schematic illustrations of FIGS. 1-5 are used to designate corresponding parts of the composite structures and/or their components; however, the examples of FIGS. 1-5 are non-exclusive and do not limit the possible configurations to the illustrated embodiments. That is, the composite structures and various components, configurations, and other characteristics thereof are not limited to the specific embodiments, and may incorporate any number of the various aspects, configurations, characteristics, properties, etc. of the composite structures that are illustrated in and discussed with reference to the schematic representations and/or the embodiments of FIGS. 1-5, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to later-discussed embodiments; however, it is within the scope of the present disclosure that any of the discussed features, variants, etc. may be utilized with any or all of the composite structures described herein.

FIG. 1, for example, shows a section of an example composite structure, generally indicated at 10. The composite structure 10 is somewhat schematically shown in that the relative sizes and positions of the components thereof may be emphasized for clarity. Moreover, the surfaces and edges of the section of composite structure 10 shown in FIG. 1 may or may not be representative of the actual composite structure 10; that is, the composite structure 10 illustrated in FIG. 1 may continue beyond the illustrated section in one or more directions.

In general, composite structure 10 is shown to include a textile arrangement 12, a first resin 14, and a second resin 16. As explained with particularity below, the first resin 14 is shown to interconnect portions of the textile arrangement 12 that are closely spaced, whereas the second resin 16 interconnects portions of the textile arrangement 12 and/or portions of the first resin 14 that are spaced further apart.

The textile arrangement 12 is shown to be formed of a number of individual textile fibers 20 woven or otherwise formed into two textile layers 22, with the "stacked" configuration of textile layers 22 collectively forming the textile arrangement 12. Two stacked textile layers 22 are shown in the illustrated section, but other embodiments may include any number of stacked textile layers 22, or only one textile layer 22, forming the textile arrangement 12.

Figure 2:
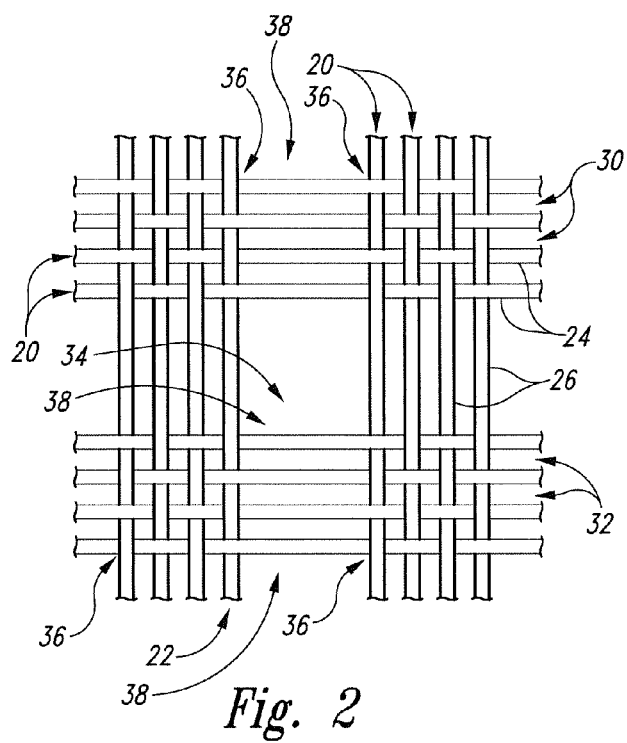
FIG. 2 is a partially schematic plan view showing a textile layer of the textile arrangement of the example composite structure shown in FIG. 1.

The textile layers 22 may be of any desired configuration, which may be an irregular array or a patterned arrangement, or some combination thereof. FIG. 2 shows the example configuration of one of the textile layers 22 of composite structure 10 in which the textile fibers 20 are shown to be woven in an illustrative bi-directional patterned configuration, with groups of warp fibers 24 interlaced with groups of weft fibers 26. FIG. 1 may thus represent a cross-section taken along the length of two of the weft fibers 26.

The warp fibers and weft fibers 24, 26 may be textile fibers 20 of the same type, size, composition, and so forth, or may differ in one or more of such aspects as appropriate to the desired configuration of the textile layer 22. In general, synthetic textile fibers 20, such as polyester, polyethylene, polyurethane, aramid, glass, ceramic, metal alloys and engineering thermoplastics such as polycarbonate ("PC"), polyether imide ("PEI"), polyphenylene sulfide ("PPS"), polyether ether ketone ("PEEK") and so forth, are known to provide favorable mechanical characteristics and better resistance to environmental factors such as temperature variations, UV radiation and moisture, relative to natural fibers, and may thus be suitable candidates for the composite structures 10 of the present disclosure. In testing examples, Honeywell Spectra® fiber 1000 (a polyethylene fiber), Kevlar® fiber (a para-amid fiber), and spandex fiber (a polyurethane-polyurea copolymer), have been used with acceptable results. However, any manner of textile fiber 20 suitable for use with the resins discussed herein is considered to be within the scope of this disclosure.

As shown perhaps most clearly in FIG. 2, the textile layer 22 includes a number of pores 30 formed by the spaces between and among textile fibers 20. The pores 30, also referred to herein as voids 30, or spaces 30, may be characterized by the distance that the adjacent textile fibers 20 between which the pore 30 is disposed are spaced from each other; this distance is also referred to herein as a "pore diameter." The use of the word "diameter" herein is not meant to indicate that any of the pores 30, or portions thereof, have a circular, spherical, or other standard geometric character (although some pores 30, or portions thereof, may), or even have a consistent form or dimensions. Rather, a pore diameter refers to the distance between the textile fibers 20 forming the pore 30, and as such may vary throughout a particular pore 30 and/or portions thereof, such as depending on the configuration of the textile layer 22, the composition of the textile fiber(s) 20, and so forth.

The pores 30, or portions thereof, may be distinguished from each other by the pore diameters thereof. For example, the term "smaller pores" (or "small pores") is used herein to refer to pores 30, or portions thereof, having a pore diameter less than or equal to a pore diameter threshold, whereas the term "larger pores" (or "large pores") is used herein to refer to pores 30, or portions thereof, having a pore diameter larger than the pore diameter threshold. The "pore diameter threshold" thus corresponds to a predetermined distance that the textile fibers 20 (or portions thereof) forming the pore 30 are spaced from each other.

Optionally, the pore diameter threshold may correspond to a wetting threshold of the textile fibers 20 with the first resin 14, as explained in greater detail below, but this is not required for all embodiments. The pore diameter threshold in some embodiments may be on the order of approximately 1 mm. In other embodiments, the pore diameter threshold may be within a range of approximately 0.01 mm to 5.0 mm, such as a pore diameter threshold of approximately one of 0.01 mm, 0.02 mm, 0.05 mm, 0.1 mm, 0.2 mm, 0.5 mm, 1.0 mm, 2.0 mm, and 5.0 mm. However, other values and ranges are within the scope of this disclosure.

Moreover, the relative sizes of the small and large pores 30 in the textile layer 22 of FIG. 2 are shown to be well-distinguished; that is, the textile fibers 20 are arranged in the textile layer 22 so that the ratio of the pore diameter of the small pores (indicated at 32) to those of the large pores (indicated at 34) is more or less consistent throughout the textile layer 22. As explained below, in some methods of producing composite structures 10 according to the present disclosure, a well-distinguished pore diameter ratio (which may refer to the scale of, for example, the pore diameters of the largest small pores 32 to those of the smallest large pores 34) may facilitate selectively filling only the small pores 32 in a textile arrangement 12 with the first resin 14. In some example embodiments, the pore diameter ratio between small pores 32 and large pores 34 is approximately one order of magnitude. However, this is not required for all embodiments that exhibit a well-defined pore diameter ratio; other examples of pore diameter ratios include a pore diameter ratio within the range of approximately 1:2 to approximately 1:100, including pore diameter ratios of approximately 1:2, 1:3, 1:4, 1:5, 1:10, 1:20, 1:50, or 1:100, although other ranges and values are within the scope of this disclosure. Further, a pore diameter ratio may vary throughout a textile layer 22, and/or may be a function of the textile forming technique used to produce the textile layer 22. Not all textile layers 22 that are suitable for use with the present disclosure are required to exhibit a pore diameter ratio.

Returning to FIG. 2, assuming a suitably scaled pore diameter threshold, the pores 30 in the textile layer 22 illustrated in FIG. 2 include small pores 32, for example between adjacent textile fibers 20 in the groups of warp and weft fibers 24, 26, and large pores 34, for example between the groups of textile fibers 20.

Figure 3:
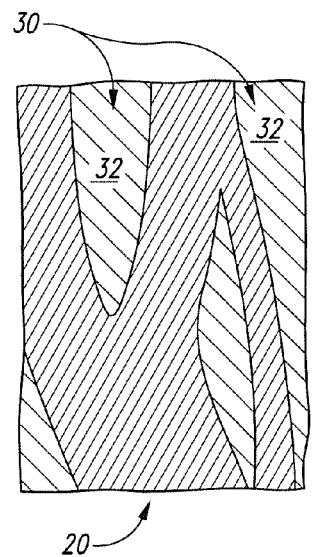
FIG. 3 is an example cross-sectional view of a textile fiber of the textile arrangement of the example composite structure shown in FIG. 1.

As they are disposed between and among textile fibers 20, pores 30 in FIG. 2 may be thought of as "inter-fiber" pores 30. The textile layer 22, or more specifically the textile fibers 20 thereof, may also include pores 30 formed within the individual fibers, which are referred to herein as "intra-fiber" pores 30. FIG. 3 represents a cross-section of a textile fiber 20 that includes intra-fiber pores 30. Not all textile fibers 20 include intra-fiber pores 30, and in those that do, the intra-fiber pores 30 will typically be smaller as compared to inter-fiber pores 30. However, this is not required for all embodiments.

Returning to FIG. 2, the textile layer 22 also may be described in terms of the variable density of textile fibers 20 throughout the layer 22. For example, the textile layer 22 is shown to include several regions of relatively higher fiber density surrounding an open space, which may be thought of as a fiber-poor or fiber-sparse region. As the term is used herein, a "fiber-rich" region, generally indicated at 36 in FIG. 2, refers to a region in a textile layer 22 or textile arrangement 12 in which all of the pores 30 are smaller pores 32, or alternatively are pores 30 that have a pore diameter equal to or less than the pore diameter threshold. Correspondingly, the term "fiber-poor" region refers to a region that is not a fiber-rich region 36; that is, a region in a textile layer 22 or textile arrangement 12 in which some of the pores 30 are smaller pores 32 and some are larger pores 34, or alternatively is a region in which some of the pores 30 have a pore diameter equal to or less than the pore diameter threshold and some have a pore diameter greater than the pore diameter threshold. The fiber-poor regions are indicated generally at 38, in FIG. 2.

In the textile layer 22 shown in FIG. 2, the fiber-rich regions 36 are regularly interspersed with the fiber-poor regions 38 in a repeating pattern. Assuming that the portion of the textile layer 22 shown in FIG. 2 is repeated throughout the textile layer 22, the illustrated pattern is one in which each fiber-poor region 38 is surrounded by a fiber-rich region 36. Moreover, the fiber-rich regions 36 are interconnected with each other to be continuous throughout the textile layer 22. Another illustrative example of such a configuration is a mesh pattern, such as is shown somewhat schematically in FIG. 4. The textile layer 22 of FIG. 4, similar to that of FIG. 2, is shown to include a patterned distribution of spaced-apart fiber-poor regions 38 that are each surrounded by fiber-rich regions 36 that are continuous throughout the textile layer 22.

Figure 5:
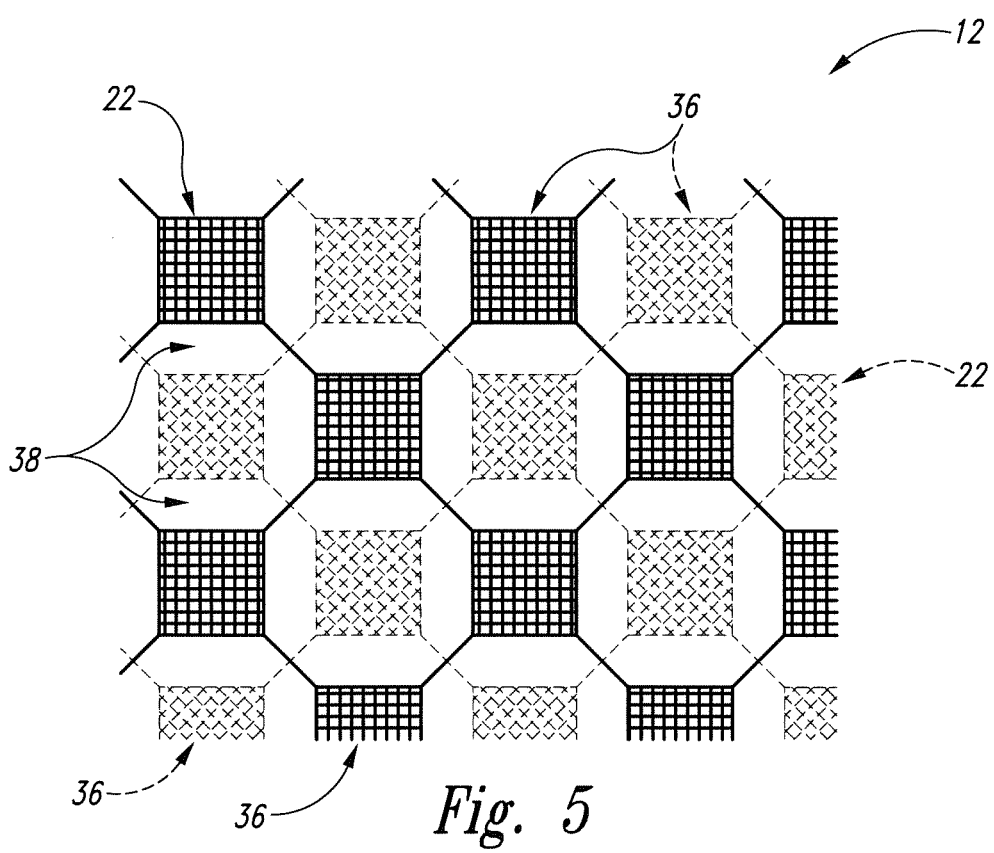
FIG. 5 is a partially schematic plan view showing another example textile layer suitable for use with composite structures constructed in accordance with the present disclosure, the example textile layer having a configuration different than that of the textile layers of FIG. 2 and FIG. 4.

FIG. 5 shows a further illustrative example of a textile arrangement 12 having two textile layers 22 formed in yet another configuration, which includes a patterned distribution of spaced-apart fiber-rich regions 36 that are each surrounded by fiber-poor regions 38 that are continuous and arranged in the same pattern throughout each textile layer 22.

It is not required to all embodiments that the textile layers 22 of a textile arrangement 12 have a patterned or even regular distribution of fiber-rich regions 36 and fiber-poor regions 38, or that either type of region 36, 38 be continuous throughout the textile layer 22 or even a portion thereof, as weaving and other textile formation techniques may produce textile layers 22 having any desired arrangement or distribution of such regions, or combinations of different arrangements, throughout the textile layer 22.

Further, although textile layer 22 is shown to be formed from one layer of textile fibers 20, this is not required for all embodiments. Textile layers 22 may have several layers of textile fibers 20, or combinations of single-layer and multiple-layer portions in a textile layer 22.

Returning to FIG. 1, as noted above, textile arrangement 12 is shown to be formed of two textile layers 22, and more particularly with the fiber-poor regions 38 and fiber-rich regions 36 of the adjacent layers staggered. In other words, each fiber-poor region 38 of the lower textile layer 22 is at least partially superposed by the fiber-rich regions 36 of the upper textile layer 22 in a direction substantially orthogonal to the stacked layers. This is also shown somewhat schematically in FIG. 5, in which the two illustrated textile layers 22 may be thought of as a "foreground" textile layer 22, drawn and indicated in solid lines, and a "background" textile layer 22, drawn and indicated in dashed lines. As shown, the textile layers 22 are positioned in the example arrangement shown in FIG. 5 with the fiber-poor regions 38 of each textile layer 22 at least partially superposed by fiber-rich regions 36 of the other textile layer. Of course, the textile arrangement 12 of FIG. 5 may include additional layers 22 that are otherwise staggered, such as to completely superpose each fiber-poor region 38 with one or more fiber-rich regions 36, and so forth. As explained in greater detail below, superposition of the fiber-poor regions 38, either partially or completely, by fiber-rich regions 36 in other textile layers 22 in the textile arrangement 12, may provide shear strength to the composite structure 10. Similarly, fiber-rich regions 36 may partially or completely overlap and/or superpose each other in respective textile layers 22. However, superposition is not required for all embodiments.

In FIG. 1 and FIG. 3, first resin 14 interconnects the closely spaced portions of the textile fibers 20; that is, the portions that are spaced from each other by a distance equal to or less than a predetermined distance. Thus, first resin 14 impregnates and fills the smaller pores 32, including the intra-fiber pores 30 shown in FIG. 3, and the inter-fiber pores 30 having a pore diameter equal to or less than the pore diameter threshold. Depending on the viscosity and/or other characteristics of the first resin 14, and/or the composite molding technique used, the first resin 14 may partially or even completely coat the exterior surface of textile fibers 20, such as shown somewhat schematically in FIG. 1, but this is not required for all embodiments. The second resin 16 interconnects the portions of the textile fibers 20, and/or regions of the first resin 14, that are spaced apart by a distance greater than the predetermined distance. Thus, second resin 16 impregnates and substantially fills the larger pores 34. "Substantially," in this context, is used to indicate that the second resin 16 fills the portions of the larger pores 34 that are not filled with the first resin 14; for example, as shown in FIG. 1, the first resin 14 may encapsulate or coat the textile fibers 20, creating a thin layer of the first resin 14 on the exterior surface of such textile fibers 20, which may be considered to partially "fill" the larger pores 34. However, in some examples, the first resin 14 may not coat the textile fibers 20 or otherwise create a layer on the surface of some or all of the textile fibers 20. As such, the term "substantially fills" is used herein to indicate that the second resin 16 fills the remaining pores 30 or portions thereof that are not filled with the first resin 14.

Although not required for all embodiments, in the illustrative embodiment shown in FIG. 1, the first resin 14 is more rigid than the second resin 16 (alternatively, the second resin 16 is more flexible than the first resin 14). For example, the first resin 14 may have an elastic modulus greater than at least one of approximately 1 GPa, 2 GPa, 5 GPa, 10 GPa, 50 GPa, or 100 GPa, wherein the second resin 16 may have an elastic modulus of less than at least one of approximately 1 GPa, 0.5 GPa, 0.2 GPa, 0.1 GPa, 0.05 GPa, or 0.01 GPa. Suitable examples of rigid first resins 14 may include any of several compounds typically used as structural matrix resins, such as thermoset resins, including but not limited to epoxy resins (for example, Momentive Epikote™ 828), phenolic resins, and so forth. Suitable examples of flexible second resins 16 may include any of several compounds that typically exhibit compliance and stretchability, such as low-durometer elastomers (e.g., elastomers having a Shore hardness D value less than at least one of approximately 10, 20, 30, 40, or 50), selective porosity foams, and so forth. Two examples of silicone elastomers suitable for use as a second resin 16 are Dow Corning® 3145 and Dow Corning® Xiameter® RBL-2004-20.

As such, in the illustrative composite structure 10 shown in FIG. 1, the fiber-rich regions 36 of the textile arrangement 12 are hardened by the first resin 14 and are interconnected by the comparatively flexible second resin 16. As a result, composite structure 10 is a solid (i.e. substantially, or completely non-porous) composite material in which the interconnected rigid regions provide mechanical properties such as shear strength, while maintaining a degree of deformability due to the nature of the flexible resin that interconnects the rigid regions. Structures having the aforementioned composition may include not only the above-described example configurations and components, but additionally or alternatively variants thereof, for example to achieve a desired degree, type, or region of shear strength, flexibility, or one or more other mechanical properties, such as may be suitable for a particular application. For example, although the composite structure 10 of FIG. 1 is shown to include one first resin 14 and one second resin 16, this is not required for all embodiments. For example, some example embodiments may include two or more different "first" resins, such as different structural matrix resins, for example to achieve reinforced regions of different mechanical properties, and/or two or more different "second" resins, such as different elastomers, for example to impart different flexible properties to the resulting composite structure, and so forth. Such variations are considered to be within the scope of this disclosure.

Figure 6:
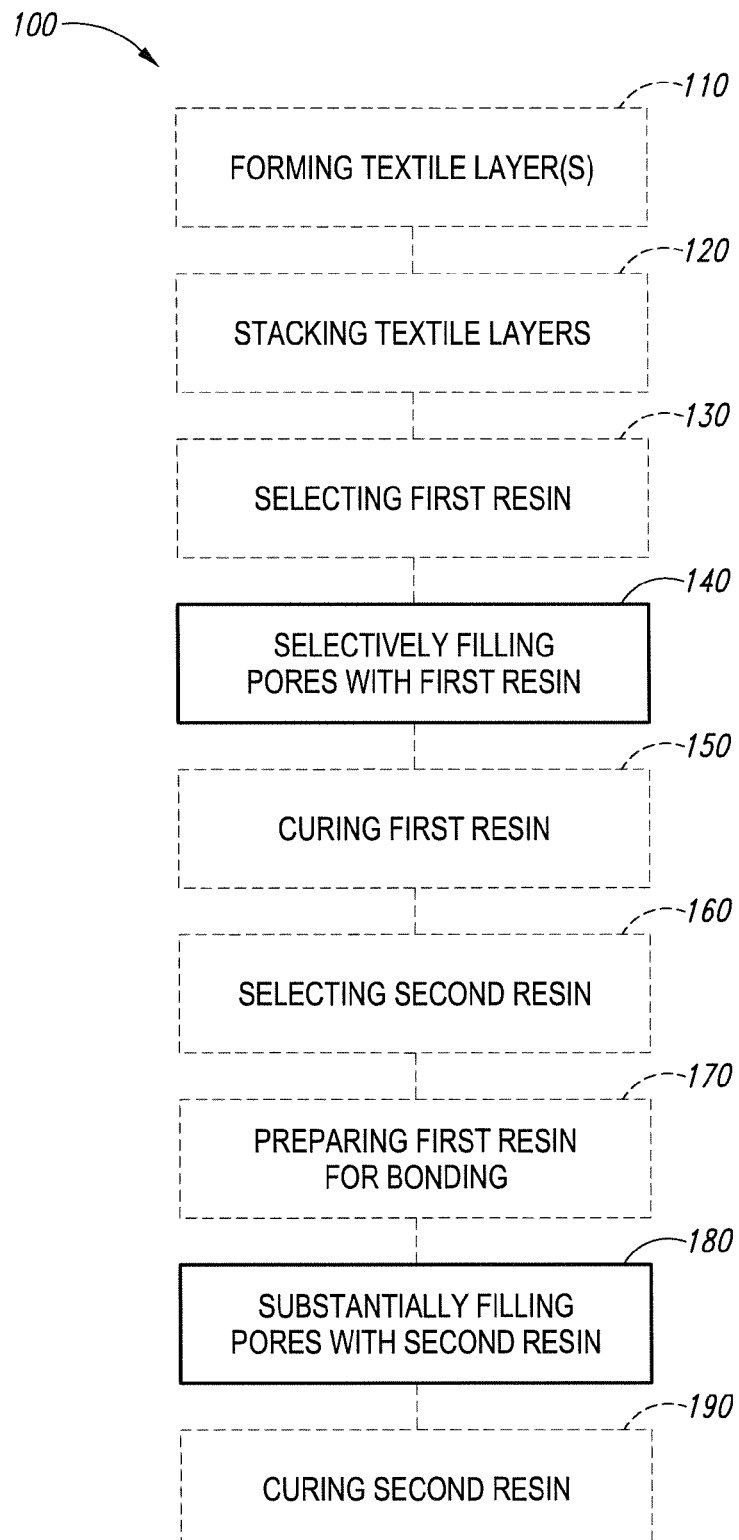
FIG. 6 is a flowchart depicting illustrative, non-exclusive examples of methods of producing a composite structure according to the present disclosure.

FIG. 6 schematically provides a flowchart that represents illustrative, non-exclusive examples of methods 100 of producing composite structures (such as the above-described composite structure 10), according to the present disclosure. In FIG. 6, some steps are illustrated in dashed boxes, indicating that such steps may be optional or may correspond to an optional version of a method 100 according to the present disclosure. That said, not all methods 100 according to the present disclosure are required to include the steps illustrated in solid boxes. The methods 100 and steps illustrated in FIG. 6 are not limiting and other methods and steps are within the scope of the present disclosure, including methods having greater than or fewer than the number of steps illustrated, and/or performed in a different order than as presented in FIG. 6, as understood from the discussions herein.

Briefly, methods 100 optionally may include forming a textile layer or layers from textile fibers, at 110, stacking two or more textile layers relative to each other, at 120. The methods 100 may optionally include selecting a first resin for use with the textile layers, at 130, and selectively filling, in one or more textile layers each having a number of pores formed therein, only those pores having a pore diameter equal to or less than a pore diameter threshold, with the first resin, at 140. Optionally, the methods may continue with curing the first resin, at 150, selecting a second resin for use with the textile layers, at 160, and preparing the first resin for bonding with the second resin, at 170. At 180, the methods may include substantially filling the remaining pores in the textile layer(s) with the second resin. Optionally, methods 100 may include curing the second resin, at 190.

Figure 4:
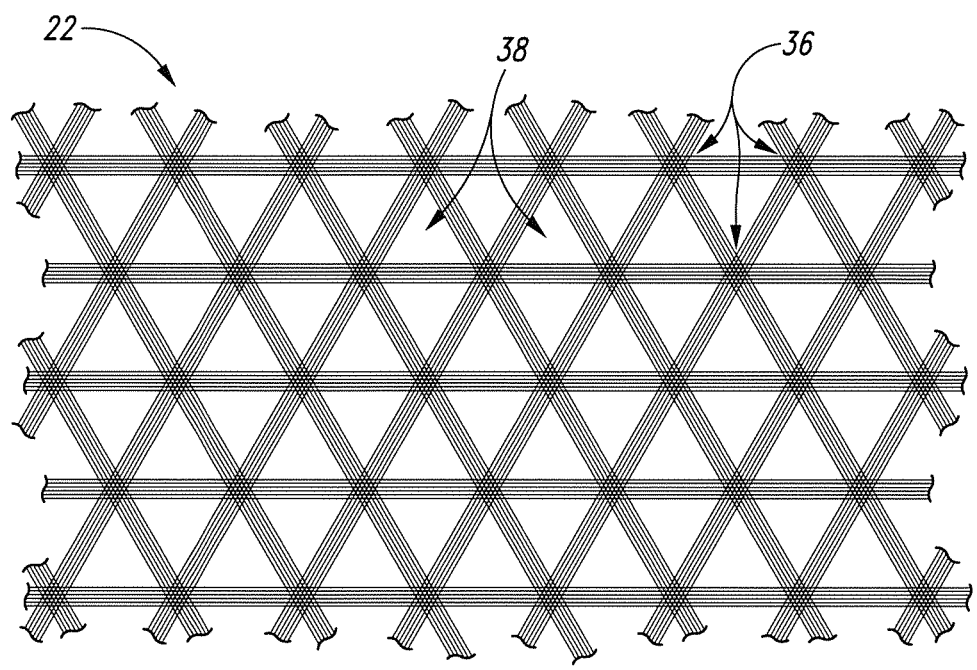
FIG. 4 is a partially schematic plan view showing an example textile layer suitable for use with composite structures constructed in accordance with the present disclosure, the example textile layer having a configuration different than that of the textile layer of FIG. 2.

Forming the textile layer, or layers, at 110, may include weaving the textile fibers, or otherwise employing textile fabrication techniques to form a textile layer having a desired distribution of fiber-rich regions interspersed with fiber-poor regions, such as the patterned configurations illustrated, for example, in any of FIGS. 2, 4, and 5, or an irregular distribution, or various combinations thereof, as described in greater detail above. Optionally, the textile layer(s) may be formed to exhibit a well-defined difference in the inter-fiber pore sizes, and/or a desired pore diameter ratio of any of the values or within the ranges described above, between small pore sizes and large pore sizes. Additionally or alternatively, the methods 100 may include the use of preformed textile layers of desired configurations and/or characteristics.

As noted above, fiber-rich regions (those containing only small pores) may be structurally reinforced by the impregnation thereof with a suitably rigid first resin; as such, superposing fiber-poor (e.g. comparatively non-rigid or non-reinforced) regions with fiber-rich (e.g. rigidly reinforced) regions, and/or overlapping the rigid/reinforced fiber-rich regions, throughout the composite structure may contribute to the shear strength of the material. Thus, stacking two or more textile layers, at 120, may include positioning the textile layers relative to each other in a desired manner. For example, the textile layers may be positioned as shown in FIG. 1 or FIG. 5, that is, with fiber-rich regions partially or completely superposing the fiber-poor regions, and optionally with fiber-rich regions at least partially superposing or overlapping each other, in a direction orthogonal to the stacked textile layers.

In some examples, such as that utilize textile layers of variable thickness, stacking the textile layers may include at least partially nesting a portion of one textile layer (such as a convex area, which may correspond to a fiber-rich region) within a portion of an adjacent textile layer (such as a concave area, which may correspond to a fiber-poor region). In FIG. 5, for example, the fiber-rich regions 36 of each textile layer 22 may have a thickness that is substantially greater than the fibers interconnecting such regions; as such, the layers may be positioned to at least partially nest the fiber-rich regions 36 of one layer 22 within the fiber-poor regions 38 of an adjacent stacked layer 22, and so forth. Utilizing nesting techniques with suitable textile geometries may affect the shear strength of the resulting composite structure, such as by creating a mechanical interlock between textile layers.

Other examples of stacking may be performed to achieve a desired shear strength, and/or other properties, of the composite structures produced by methods 100.

Stacking or otherwise preparing the textile layer(s) for treatment with the first resin may be performed according to standard composite molding techniques, for example through use of a mold or other form in which one or more textile layers may be positioned and held, the application of a vacuum or otherwise maintaining a desired pressure, and so forth.

At 130, the first resin may optionally be selected. Suitable resins to confer rigidity to a textile layer may include any of the above-described structural matrix resins, or combinations thereof. In some methods 100, the first resin may be selected based on its wetting threshold with respect to the textile fibers of the textile layer to be impregnated with the resin, such as to achieve selective filling of only the smaller pores in the textile layer with the first resin. The wetting threshold of a particular resin may vary based on factors such as the composite molding technique used, the conditions under which wetting is performed, the nature of the textile fibers, the resin viscosity, the pore diameter, and so forth. In some applications, the wetting threshold can be estimated for a set of known conditions by using the Lucas-Washburn equation. For example, in vacuum-assisted resin composite molding techniques, one asymptotic solution to the Lucas-Washburn equation (corresponding to a short-time limit) is:

$$D = \frac{4\eta L^2}{\gamma \cos\theta t}$$
$$= \frac{\gamma \cos\theta}{P}$$

with
  $D$=pore diameter,
  $\eta$=resin viscosity,
  $L$=capillary length,
  $\gamma$=surface tension,
  $\theta$=wetting angle,
  $t$=time, and
  $P$=pressure.

Thus, a first resin may be selected, at 130, to have a predetermined wetting threshold with respect to the textile fibers that is predicted to limit the first resin to fill only those pores having a pore diameter equal to or less than a pore diameter threshold. Of course, other predictive techniques may be optionally employed, at 130.

The selection of a suitable first resin, at 130, may be performed based at least in part on the manner in which the first resin is applied to the textile layer. For example, the predictive techniques discussed above may be suitable for methods 100 that include non-selective application of the first resin, such as dipping the textile layer in the first resin in liquid form. Methods 100 that include selective application of the first resin, at 140, such as by applying the first resin only to those regions desired to be impregnated by the first resin, optionally may employ other selection techniques, at 130, for example identifying suitable first resins through experimentation with textile layers formed of different textile fibers and/or in different configurations, and so forth.

In still other example methods 100, one or more pre-pregs (pre-impregnated composite textiles, in which a material, such as an epoxy, is already present), may be used.

At 140, selectively filling the small pores of the textile layer(s) may include selectively applying the first resin thereto, as noted above, for example, selectively applying the first resin to one or more fiber-rich regions in the textile layer while not applying the first resin to the fiber-poor regions. In some methods, selectively applying the first resin may include masking regions of the textile layer. For example, at least part of the fiber-poor regions may be masked, such as to prevent the first resin from filling or otherwise infiltrating pores therein, according to masking techniques, which may involve the use of one or more masking agents adapted to function as a chemical barrier, and so forth.

In methods 100 in which two or more textile layers and/or pre-pregs are stacked to form a textile arrangement, selectively filling the small pores, at 140, may optionally include at least partially bonding two or more of the stacked textile layers to each other, for example by filling the voids or gaps between textile fibers of adjacent stacked textile layers that are spaced apart from each other by a distance equal to or less than a predetermined distance (e.g., the pore diameter threshold).

The infiltration process may be performed according to standard techniques, such as by placing a mold in which a textile arrangement has been placed in a vacuum bag, the use of components such as peel plies, wet and/or dry breathers/bleeders, release agents, and so forth, as appropriate to the resin and/or textile arrangement.

At 150, the first resin may optionally be cured, for example by employing standard curing techniques appropriate to the resin, such as autoclaving, UV irradiation, etc.

Methods 100 may optionally include, at 160, selecting the second resin. Somewhat similar to step 130, selecting the first resin, selecting the second resin, at 160, may be performed in order to confer a desired characteristic to the resulting composite material, or at least the portions thereof consisting of the second resin. One example characteristic may be the degree of flexibility of the resulting composite material. Optionally, the second resin may be selected, at 160, based on other characteristics, such as viscosity, ease of handling (e.g., in pre-cured and/or in cured form), stretchability, softness, reactivity with the first resin and/or the textile fibers, curing requirements, and so forth, one or more of which may depend on the application in which the resulting composite material will be used. Suitable second resins may include any of the above-described elastomeric materials, or combinations thereof.

In some methods 100, the selection of the second resin, at 160, is perhaps less restrictive as compared to the selection of the first resin, at 130, for example due to the sequence in which the resins are applied. In other words, in some composite molding techniques, the first resin is selected in order to selectively fill only the small pores in a pore distribution of a textile layer. The second resin, however, infiltrates and fills all of the remaining voids that are not filled by the first resin, or in other words, substantially fills the remaining pores (i.e., the portions thereof that are not filled with the first resin). As such, the second resin in such methods is not required to, but may, exhibit selectivity in terms of pore size.

Methods 100 may further include, at 170, preparing the first resin for bonding with the second resin. In example methods 100 in which the first resin is applied to the textile layer and then cured, preparing the first resin, at 170, may include treating the impregnated textile layer, or at least the portions thereof to which the first resin was applied, with a compatibilizing agent, such as to ensure the chemistries of the two resins will result in a favorable bond between the interfaces thereof, followed by the application of the second resin. Suitable compatibilizing agents may be in the form of chemical primers, adhesives, sealants, and so forth, and may be selected based on the composition(s) of the first and/or second resin(s). In examples in which the first resin is, or includes, an epoxy resin and in which the second resin is, or includes, a silicone elastomer, example compatibilizing agents include Dow Corning® 1200 OS primer, Chemlok® 607 adhesive (produced by LORD Corporation), SP-270 primer (produced by NuSil Technology Products, Inc.) and so forth.

Optionally, in some example methods 100 in which a compatibilizing agent is employed, the agent may be mixed with either (or both) resin(s) before the application thereof to the textile arrangement, if suitable.

Other methods of preparing the first resin for bonding with the second resin, at 170, may include steps in addition or alternatively to treating the first resin with a compatibilizing agent, such as may be appropriate for the chemistries of the two resins. Examples may include mechanical treatment of the surfaces of the first resin, irradiation, heating, and so forth.

At 180, the example methods 100 may include substantially filling the remaining pores in the textile layer with the second resin. This step may include applying the second resin to textile fibers of the textile layer and/or to the first resin (such as subsequent to curing and/or treating the first resin with a compatibilizing agent). As noted above, "substantially" refers to filling the portions of the remaining pores that are not filled with the first resin, such as in methods in which the first resin encapsulates or otherwise coats the textile fibers to which it has been applied.

In some example methods 100, substantially filling the remaining pores, at 180, may optionally include bonding the second resin to the first resin and/or bonding the second resin to the textile fibers of at least one textile layer.

In example methods 100, one or both of the resins may be applied in liquid form, or otherwise as suitable to the resin and/or composite molding techniques used. In liquid form, standard application techniques may be used, such as spraying, dipping, casting, and so forth. Some resins may be applied in solid form, such as a powder, granules, and so forth, which may then effectively be melted in order to impregnate the respective portions of the textile arrangement. Some resins may also be intermingled or comingled as fibers in one or more textile layers. Thus, such fibers can be melted and consolidate the textile fibers in the respective portions.

At 190, the example methods may optionally include curing the second resin.

Several variations of the example methods 100 discussed above are possible and are within the scope of the present disclosure. For example, steps relating to the first resin (e.g., selecting, selectively filling pores, curing, treating) may involve two or more different "first" resins, such as sequential or simultaneous use of different structural matrix resins to achieve rigid regions of different rigidities or mechanical properties, chemical compatibility with different textile fibers, processing efficiency, cost, environmental concerns, and so forth. In one non-limiting example, two "first" resins may be used, one to reinforce fiber-rich regions of a textile layer and another to at least partially bond stacked, reinforced textile layers together. Correspondingly, steps relating to the second resin may involve two or more different "second" resins, such as sequential or simultaneous use of different elastomers for similar reasons (mechanical properties, etc.). In another non-limiting example, two "second" resins may be used; one to fill remaining voids in a bonded, reinforced textile arrangement, and another to bond multiple composite structures together, and so forth.

In some example methods 100 and embodiments, the use of "first" and "second," when referring to the respective resins used to form the composite structures in accordance with the present disclosure, may (but are not required to) relate to the sequence in which the respective resins are applied. For example, in some methods 100, a rigid structural resin is selectively applied first to fill the small pores in a textile arrangement, followed by a flexible resin that fills the remaining (e.g., the large) pores. In such methods, such as those in which an elastomer such as silicone is used as the "second" resin, applying the "second" resin first may result in infiltration of the flexible resin into the small pores, interfering with reinforcement of fiber-rich regions when the rigid resin is later applied. Additionally, the chemistry of some elastomeric resins may not permit (and thus "poison") the curing, at 150, of the first resin, interfering with robust bonding and/or interconnection of multiple textile layers. However, other resin pairs may not exhibit the aforementioned incompatibility and/or interference, and may permit sequential or even simultaneous introduction of resins in some methods. Thus, in some example methods 100 and embodiments, the use of "first" and "second" in the aforementioned manner may (but are not required to) indicate types of resins (e.g., "first" may refer to a rigid resin or resins, whereas "second" may refer to a flexible resin or resins). Optionally, the terms "first" and "second," when used in the aforementioned manner, may simply function to designate two different resins.

Example applications of the composite structures of the present disclosure (such as composite structure 10) are not particularly limited. In embodiments in which the composition of the structure provides shear strength while offering deformability, such composite structures may be incorporated into vehicle design. One example is the use of the composite structure to form or cover structural elements, semi-structural regions such as between fixed structure and control surfaces, and so forth. In particular, in an aerostructure of an aircraft, a composite structure may form or be incorporated into an aircraft skin or portion thereof.

Figure 7:
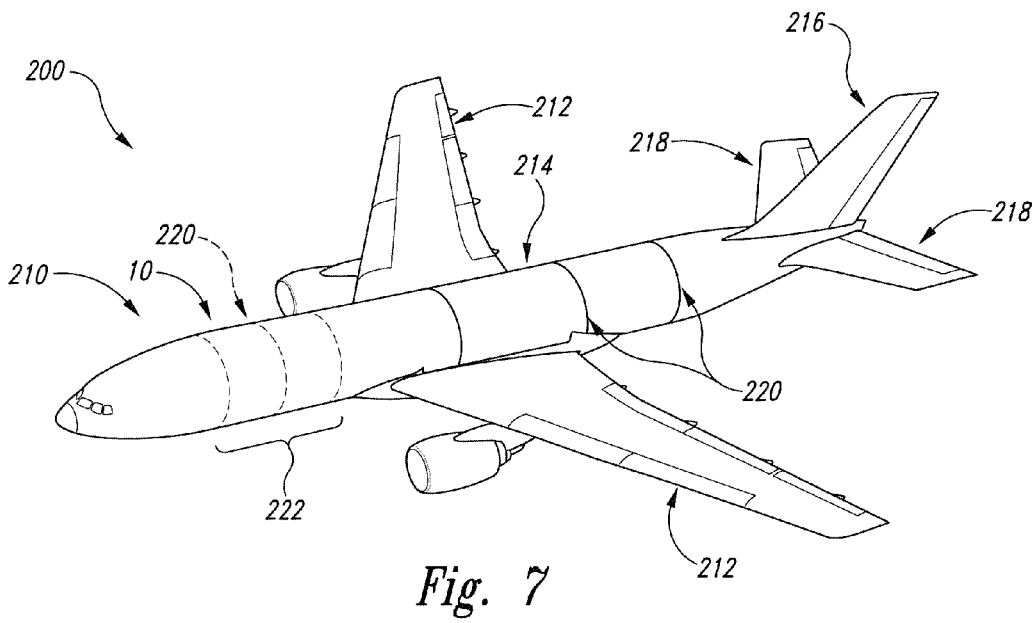
FIG. 7 is a schematic perspective view showing primary structural elements of an aircraft incorporating a composite structure according to the present disclosure.

FIG. 7 is a schematic perspective view showing primary structural elements of an aircraft 200 in the form of an airplane 210. In FIG. 7, airplane 210 includes various structural elements such as main wings 212, fuselage 214, vertical fin 216, and horizontal stabilizers 218. Fuselage 214 is further shown to include a number of joints 220, such as may indicate sites at which sections of the fuselage 214 are joined together such as during assembly of the airplane 210. Such joints 220 represent potential sources of vortex-induced drag during flight. In some embodiments, composite structures 10 according to the present disclosure may be incorporated into the skins of respective sections of fuselage 214, such as by applying or forming a layer of the composite structure 10 after the sections have been joined. For example, FIG. 7 is shown to include a composite skin section, schematically indicated at 222 with dashed lines to indicate that the section 222 may extend beyond the region shown, that covers one of the joints 220. Composite skin section 222 may incorporate or may be formed of one or more composite structures according to the present disclosure (such as composite structure 10).

Figure 8:
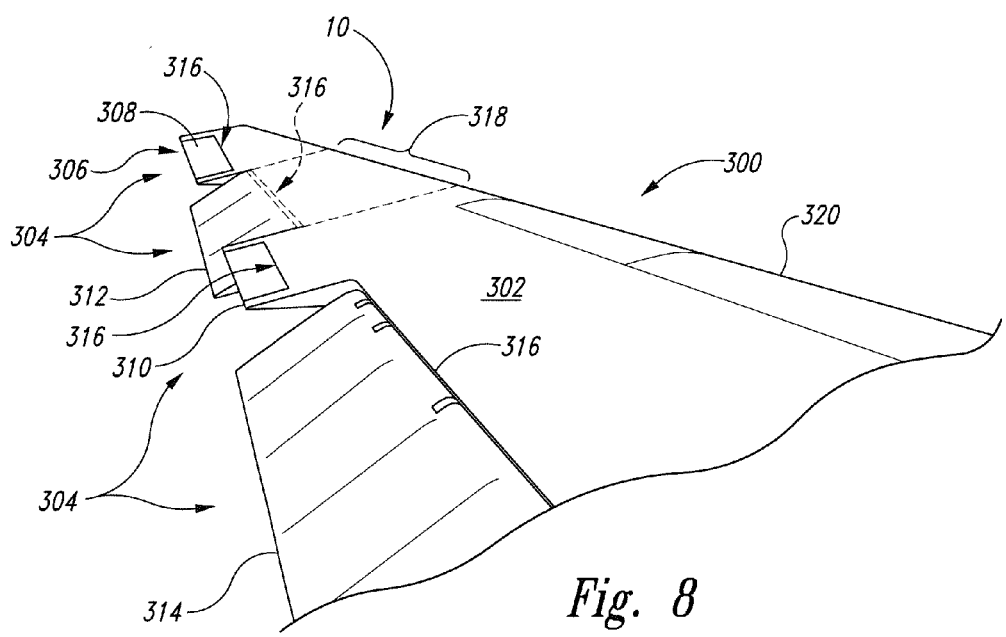
FIG. 8 is a schematic perspective view showing an example airplane wing and control surfaces of incorporating a composite structure according to the present disclosure.

FIG. 8 is a schematic perspective view showing fixed and control surfaces of an airplane wing 300. In FIG. 8, wing 300 is shown to include wing skin 302, and several control surfaces 304 disposed along the trailing edge 306, including outboard and inboard ailerons 308, 310 and outboard and inboard flaps 312, 314 movably attached to the wing skin 302. The regions 316 between the fixed wing skin surface 302 and the various control surfaces 304 also represent potential sources of vortex-induced drag during flight. In some embodiments, composite structures according to the present disclosure (such as composite structure 10) may be incorporated into continuous wing skins 302 extending from the main, fixed portion of the wing 300 to the control surface 304, such as to cover the hinge structure or channels in which the hinges or similar structure are positioned. For example, FIG. 8 is shown to include a composite skin section indicated at 318 with dashed lines to indicate that the section 318 may extend beyond the region shown, that extends from the leading edge 320 of the wing, over region 316, to the outboard flap 312. Composite skin section 318 may incorporate or may be formed of one or more composite structures (such as composite structure 10) according to the present disclosure.

Illustrative, non-exclusive, and non-exhaustive examples of inventive subject matter according to the present disclosure are described in the following enumerated paragraphs:

A. A composite structure, comprising:

a textile arrangement of at least one textile layer constructed of textile fibers and having a distribution of pores formed therein, the distribution of pores including a number of intra-fiber pores within individual textile fibers and a number of inter-fiber pores between textile fibers;

a first resin filling the intra-fiber pores and also those inter-fiber pores having a pore diameter equal to or less than a pore diameter threshold; and a second resin bonded to the first resin and substantially filling those inter-fiber pores having a pore diameter greater than the pore diameter threshold.

A.1 The composite structure of paragraph A, wherein the first resin is more rigid than the second resin.

A.2 The composite structure of paragraph A or A.1, wherein the first resin includes more than one resin.

A.3 The composite structure of any of paragraphs A-A.2, wherein the first resin has an elastic modulus greater than at least one of approximately 1 GPa, 2 GPa, 5 GPa, 10 GPa, 50 GPa, or 100 GPa.

A.4 The composite structure of any of paragraphs A-A.3, wherein the second resin is more flexible than the first resin.

A.4 The composite structure of any of paragraphs A-A.4, wherein the second resin has an elastic modulus less than at least one of approximately 1 GPa, 0.5 GPa, 0.2 GPa, 0.1 GPa, 0.05 GPa, or 0.01 GPa.

A.5 The composite structure of any of paragraphs A-A.4, wherein the second resin includes more than one resin.

A.6 The composite structure of any of paragraphs A-A.5, wherein the at least one textile layer includes one or more fiber-rich regions, within which all of the inter-fiber pores have a pore diameter equal to or less than the pore diameter threshold, and one or more fiber-poor regions, within which some of the inter-fiber pores have a pore diameter equal to or less than the pore diameter threshold and some have a pore diameter greater than the pore diameter threshold; and wherein the one or more fiber-rich regions are interspersed with the one or more fiber-poor regions.

A.6.1 The composite structure of paragraph A.6, wherein the one or more fiber-rich regions and the one or more fiber-poor regions are irregularly interspersed.

A.6.2. The composite structure of paragraph A.6 or A.6.1, wherein at least one fiber-rich region is surrounded by one or more fiber-poor regions.

A.6.3. The composite structure of paragraph A.6 or A.6.1, wherein at least one fiber-poor region is surrounded by one or more fiber-rich regions.

A.6.4. The composite structure of paragraph A.6, wherein the one or more fiber-rich regions and the one or more fiber-poor regions are interspersed in a pattern.

A.6.4.1 The composite structure of paragraph A.6.4, wherein at least one fiber-rich region is surrounded by one or more fiber-poor regions.

A.6.4.1.1 The composite structure of paragraph A.6.4.1, wherein at least one fiber-poor region is continuous throughout at least one textile layer; and wherein the fiber-rich region throughout the at least one textile layer are regularly spaced-apart.

A.6.4.2 The composite structure of paragraph A.6.4, wherein at least one fiber-poor region is surrounded by one or more fiber-rich regions.

A.6.4.2.1 The composite structure of paragraph A.6.4.2, wherein at least one fiber-rich region is continuous throughout the textile layer; and wherein the pattern is a mesh pattern.

A.7 The composite structure of any of paragraphs A-A.6.4.2.1, wherein the ratio of the pore diameters of inter-fiber pores having a diameter equal to or less than the pore diameter threshold to the pore diameters of inter-fiber pores having a diameter greater than the pore diameter threshold is within the range of approximately 1:2 to 1:100.

A.7.1. The composite structure of paragraph A.7, wherein the ratio is approximately one of 1:2, 1:3, 1:4, 1:5, 1:10, 1:20, 1:50, or 1:100.

A.8 The composite structure of any of paragraphs A-A.7.1, wherein the pore diameter threshold is within a range of approximately 0.01 mm to 5.0 mm.

A.9 The composite structure of any of paragraphs A-A.8, wherein the pore diameter threshold is approximately one of 0.01 mm, 0.02 mm, 0.05 mm, 0.1 mm, 0.2 mm, 0.5 mm, 1.0 mm, 2.0 mm, and 5.0 mm.

A.10 The composite structure of any of paragraphs A-A.9, wherein the pore diameter threshold corresponds to a wetting threshold of the textile fibers of at least one textile layer with the first resin.

A.11 The composite structure of any of paragraphs A-A.10, wherein the second resin does not fill the intra-fiber pores or the inter-fiber pores having a pore diameter equal to or less than the pore diameter threshold.

A.12 The composite structure of any of paragraphs A-A.11, wherein the textile fibers are synthetic.

A.13 The composite structure of any of paragraphs A-A.12, wherein the textile fibers include one or more of polyester, polyurethane, and polyethylene.

A.14 The composite structure of any of paragraphs A-A.13, wherein the first resin is bonded to the textile fibers.

A.15 The composite structure of any of paragraphs A-A.14, wherein the first resin includes a thermoset, and/or wherein the second resin includes an elastomer.

A.15.1 The composite structure of paragraph A.15, wherein the first resin includes a thermoset having an elastic modulus greater than at least one of approximately 1 GPa, 2 GPa, 5 GPa, 10 GPa, 50 GPa, or 100 GPa, and/or wherein the second resin includes an elastomer having a Shore hardness D value less than at least one of approximately 10, 20, 30, 40, or 50.

A.15.2 The composite structure of paragraph A.15 or A.15.1, wherein the first resin includes an epoxy, and/or wherein the second resin includes a silicone.

A.16 The composite structure of any of paragraphs A-A.15.2, wherein the composite structure is solid.

A.17 The composite structure of any of paragraphs A-A.16, wherein the textile arrangement comprises two or more stacked textile layers.

A.17.1 The composite structure of paragraph A.17, wherein the stacked textile layers are bonded to each other by the first and second resins.

A.17.2 The composite structure of paragraph A.17, wherein at least some of the inter-fiber pores between textile fibers of adjacent stacked textile layers have a pore diameter equal to or less than the pore diameter threshold.

A.17.3 The composite structure of any of paragraphs A.17-A.17.2, wherein at least two of the stacked textile layers are of similar configuration.

A.17.4 The composite structure of any of paragraphs A.17-A.17.3, wherein at least two of the stacked textile layers are of dissimilar configuration.

A.17.5 The composite structure of any of paragraphs A.17-A.17.4, wherein each textile layer includes one or more fiber-rich regions interspersed with one or more fiber-poor regions; and wherein at least one fiber-rich region of at least one textile layer is superposed by one or more fiber-poor regions of at least one other textile layer, in a direction substantially orthogonal to the layers.

A.17.5.1 The composite structure of paragraph A.17.5, wherein each fiber-poor region of at least one textile layer is at least partially (and optionally completely) superposed by one or more fiber-rich regions of at least one other textile layer, in a direction substantially orthogonal to the layers.

A.17.5.2 The composite structure of paragraph A.17.5 or A.17.5.1, wherein one or more fiber-rich regions of at least one textile layer are at least partially superposed by one or more fiber-rich regions of at least one other textile layer, in a direction substantially orthogonal to the layers.

A.18 The composite structure of any of paragraphs A-A.17.5.2, wherein the composite structure is flexible.

B. A composite structure comprising a textile arrangement formed of textile fibers, a first resin, and a second resin;

wherein the first resin interconnects portions of the textile fibers that are spaced from each other by a distance equal to or less than a predetermined distance; and wherein the second resin interconnects portions of the textile fibers that are spaced from each other by a distance greater than the predetermined distance.

B.1 The composite structure of paragraph B, wherein the second resin interconnects portions of the first resin that are spaced from each other by a distance greater than the predetermined distance.

B.1.1 The composite structure of either of paragraphs B or B.1, wherein the composite structure is solid.

B.2 The composite structure of any of paragraphs B-B.1.1, wherein at least some of the textile fibers include intra-fiber spaces within said textile fibers; and wherein the intra-fiber spaces are filled with the first resin.

B.3 The composite structure of any of paragraphs B-B.2, wherein the textile fibers are at least partially coated with the first resin.

B.4 The composite structure of any of paragraphs B-B.3, wherein the textile arrangement includes at least one textile layer having one or more fiber-rich regions, within which all of the textile fibers are spaced from each other by a distance equal to or less than the predetermined distance, interspersed with one or more fiber-poor regions, within which the textile fibers include one or more portions that are spaced apart from each other by a distance equal to or less than the predetermined distance and one or more portions that are spaced apart from each other by a distance greater than the predetermined distance.

B.4.1 The composite structure of paragraph B.4, wherein the fiber-rich regions contain only textile fibers interconnected by the first resin.

B.4.2 The composite structure of either of paragraphs B.4 or B.4.1, wherein the fiber-rich regions have a greater rigidity as compared with the fiber-poor regions.

B.4.3 The composite structure of any of paragraphs B.4-B.4.2, wherein the textile arrangement includes two or more stacked textile layers each including one or more fiber-rich regions interspersed with one or more fiber-poor regions.

B.4.3.1 The composite structure of paragraph B.4.3, wherein at least one fiber-poor region of at least one textile layer is superposed (and optionally completely superposed) by one or more fiber-rich regions of at least one other textile layer, in a direction substantially orthogonal to the layers.

B.5 The composite structure of any of paragraphs B-B.4.3.1, wherein the first resin has a greater rigidity as compared with the second resin.

B.6 The composite structure of any of paragraphs B-B.5, wherein the composite structure is flexible.

B.7 A structural, exterior, or interior element of a vehicle, or part or portion thereof, formed of the composite structure of any of paragraphs A-A.12 and B-B.6.

B.7.1 The structural, exterior, or interior element of paragraph B.7, wherein the vehicle is an aero-structure.

B.7.2 The structural, exterior, or interior element of paragraph B.7 or B.7.1, wherein the vehicle is an airplane, a spacecraft, a missile, and a helicopter.

B.7.3 A vehicle including at least one structural, exterior, or interior element, or part or portion thereof, of any of paragraphs B.7-B.7.2.

B.7.3.1 The vehicle of paragraph B.7.3, wherein the vehicle is an aero-structure.

B.7.4 A method of producing the vehicle and/or the at least one structural, exterior, or interior element, or part or portion thereof, of any of paragraphs B.7-8.7.3.1.

B.8 The use of the composite structure of any of paragraphs A-A.12 and B-B.6 in a structural, exterior, or interior element of a vehicle, or part or portion thereof.

B.9 A method of producing the composite structure of any of paragraphs A-A.12 and B-B.6.

B.9.1 The method of paragraph B.9 including any of the steps recited in any of paragraphs C-C.6.

C. A method of producing a composite structure; the method comprising:

selectively filling, in a textile layer having a number of pores formed therein, only those pores having a pore diameter equal to or less than a pore diameter threshold, with a first resin; and substantially filling the remaining pores in the textile layer with a second resin.

C.1 The method of paragraph C,
wherein the textile layer is formed of textile fibers;
wherein at least some of the number of pores in the textile are inter-fiber pores between textile fibers; and
wherein the selectively filling includes filling those inter-fiber pores having a pore diameter equal to or less than the pore diameter threshold.

C.2 The method of paragraph C or CA, further comprising:
forming the textile layer from textile fibers.

C.2.1 The method of paragraph C.2, wherein the forming the textile layer is performed prior to the selectively filling.

C.2.2 The method of paragraph C.2 or C.2.1, wherein the forming the textile layer includes weaving the textile fibers.

C.2.3 The method of any of paragraphs C.2-C.2.2, wherein the forming the textile layer includes forming the pores in the textile layer such that the ratio of the pore diameters of inter-fiber pores having a diameter equal to or less than the pore diameter threshold to the pore diameters of inter-fiber pores having a diameter greater than the pore diameter threshold is within the range of approximately 1:2 to approximately 1:100.

C.2.4. The method of any of paragraphs C.2-C.2.3, wherein the forming the textile layer includes forming the pores in the textile layer such that the ratio of the pore diameters of inter-fiber pores having a diameter equal to or less than the pore diameter threshold to the pore diameters of inter-fiber pores having a diameter greater than the pore diameter threshold is one of approximately 1:2, 1:3, 1:4, 1:5, 1:10, 1:20, 1:50, or 1:100.

C.2.5 The method of any of paragraphs C.2-C.2.4, wherein the forming the textile layer includes interspersing one or more fiber-rich regions, within which all of the pores have a pore diameter equal to or less than the pore diameter threshold, with one or more fiber-poor regions, within which some of the pores have a pore diameter equal to or less than the pore diameter threshold and some have a pore diameter greater than the pore diameter threshold.

C.2.5.1 The method of paragraph C.2.5, wherein the interspersing further includes irregularly interspersing.

C.2.5.2 The method of paragraph C.2.5, wherein the interspersing further includes interspersing in a pattern.

C.2.5.2.1 The method of paragraph C.2.5.1 or C.2.5.2, wherein the interspersing further includes surrounding at least one fiber-rich region with one or more fiber-poor regions.

C.2.5.2.1.1 The method of paragraph C.2.5.2.1,
wherein at least one fiber-poor region is continuous throughout the textile layer; and
wherein the fiber-rich regions are interspersed throughout the at least one continuous fiber-poor region in a regularly spaced-apart pattern.

C.2.5.2.2 The method of paragraph C.2.5.1 or C.2.5.2, wherein the interspersing further includes surrounding at least one fiber-poor region with one or more fiber-rich regions.

C.2.5.2.2.1 The method of paragraph C.2.5.2.2,
wherein at least one fiber-rich region is continuous throughout the textile layer; and
wherein the fiber-poor regions are interspersed throughout the at least one continuous fiber-poor region in a mesh pattern.

C.3 The method of any of paragraphs C-C.2.5.2.2.1, further comprising:
stacking two or more textile layers.

C.3.1 The method of paragraph C.3, wherein the stacking is performed prior to the selectively filling.

C.3.1.1 The method of paragraph C.3.1, wherein the selectively filling is performed in two or more of the stacked textile layers.

C.3.1.2 The method of paragraph C.3.1 or C.3.1.1, wherein the selectively filling includes at least partially bonding two or more of the stacked textile layers to each other.

C.3.1.3 The method of any of paragraphs C.3.1-C.3.1.2, wherein the stacking is performed in a mold.

C.3.2 The method of any of paragraphs C.3.1-C.3.1.3,
wherein at least one textile layer includes one or more fiber-rich regions, within which all of the pores have a pore diameter equal to or less than the pore diameter threshold, and one or more fiber-poor regions, within which some of the pores have a pore diameter equal to or less than the pore diameter threshold and some have a pore diameter greater than the pore diameter threshold; and
wherein the stacking includes positioning the textile layers relative to each other so that at least one fiber-poor region of at least one textile layer is superposed (and optionally completely superposed) by one or more fiber-rich regions of at least one other textile layer, in a direction substantially orthogonal to the layers.

C.3.2.1 The method of any of paragraphs C.3.1-C.3.2, wherein stacking includes positioning the textile layers relative to each other so that at least one fiber-rich region of at least one textile layer at least partially superposes one or more fiber-rich regions of at least one other textile layer, in a direction substantially orthogonal to the layers.

C.3.3 The method of any of paragraphs C.3.1-C.3.2.1,
wherein at least one surface of a first textile layer includes a convex area and at least one surface of a second textile layer includes a concave area, and wherein the stacking includes at least partially nesting the convex area of the first textile layer within the concave area of the second textile layer.

C.3.3.1 The method of paragraph C.3.3, wherein the convex area includes at least a portion of a fiber-poor region and wherein the concave area includes at least a portion of a fiber-rich region.

C.3.4 The method of any of paragraphs C.3-C.3.3.1, wherein the substantially filling includes at least partially bonding at least two stacked textile layers to each other.

C.4 The method of any of the paragraphs C-C.3.4, wherein one or both of the selectively filling and the substantially filling includes applying the respective resin to the textile layer in liquid form.

C.4.1 The method of paragraph C.4, wherein the selectively filling includes non-selectively applying the first resin to the textile layer.

C.4.1.1 The method of paragraph C.4.1, wherein the non-selectively applying includes dipping.

C.4.2 The method of any of paragraphs C.4-C.4.1.1, wherein the first resin has a predetermined wetting threshold with respect to the textile fibers of the textile layer that is predicted to limit the first resin to fill only those pores having a pore diameter equal to or less than the pore diameter threshold.

C.4.2.1 The method of paragraph C.4.2, further comprising:
selecting the first resin based on its predetermined wetting threshold with respect to the textile fibers of the textile layer.

C.4.3 The method of paragraph C.4, wherein the selectively filling includes selectively applying the first resin to the textile layer.

C.4.3.1 The method of paragraph C.4.3,
wherein the textile layer includes one or more fiber-rich regions, within which all of the pores have a pore diameter equal to or less than the pore diameter threshold, interspersed with one or more fiber-poor regions, within which some of the pores have a pore diameter equal to or less than the pore diameter threshold and some have a pore diameter greater than the pore diameter threshold, and
wherein the selectively applying includes applying the first resin to the fiber-rich regions while not applying the first resin to at least part of the fiber-poor regions.

C.4.3.1.1 The method of paragraph C.4.3, wherein the selective applying includes masking at least part of the fiber-poor regions of the textile layer.

C.5 The method of any of paragraphs C-C.4.3.1.1, further comprising:
curing the first resin.

C.5.1 The method of paragraph C.5, wherein the curing is performed prior to the substantially filling.

C.6 The method of any of paragraphs C-C.5.1, further comprising:
preparing the first resin for bonding with the second resin.

C.6.1 The method of paragraph C.6, wherein the preparing is performed prior to the substantially filling.

C.6.2 The method of paragraph C.6 or C.6.1, wherein the preparing includes treating the first resin with a compatibilizing agent.

C.6.2.1 The method of paragraph C.6.2, wherein the treating includes mixing the compatibilizing agent with the first resin prior to selectively filling pores with the first resin.

C.6.2.2 The method of paragraph C.6.2, wherein the treating includes applying the compatibilizing agent to the first resin.

C.6.2.2.1 The method of paragraph C.6.2.2, further comprising:
curing the first resin; and
wherein the treating is performed after the curing, and includes applying the compatibilizing agent to the cured first resin.

C.6.2.2.1.1 The method of paragraph C.6.2.2.1,
wherein the substantially filling includes applying the second resin to the textile layer and the cured first resin, and
wherein the treating includes mixing the compatibilizing agent with the second resin prior to the application of the second resin.

C.7 The method of any of paragraphs C-C.6.2.2.1.1, wherein the substantially filling includes bonding the second resin to the first resin.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:
1. A composite structure, comprising:
a textile arrangement of at least one textile layer, the textile layer constructed of textile fibers and having a single distribution of pores formed therein, the single distribution of the pores consisting of intra-fiber pores within individual textile fibers and inter-fiber pores between the textile fibers;
a first resin filling all of the intra-fiber pores of the single distribution of the pores and also those inter-fiber pores of the single distribution of the pores having a pore diameter equal to or less than a pore diameter threshold; and a second resin bonded to the first resin and substantially filling those inter-fiber pores of the single distribution of the pores having the pore diameter greater than the pore diameter threshold.

2. The composite structure of claim 1, wherein the first resin is more rigid than the second resin.

3. The composite structure of claim 2, wherein the first resin has an elastic modulus greater than approximately 1 GPa, and wherein the second resin has an elastic modulus less than approximately 1 GPa.

4. The composite structure of claim 3, wherein the first resin includes a thermoset and wherein the second resin includes an elastomer.

5. The composite structure of claim 3, wherein the first resin includes an epoxy.

6. The composite structure of claim 3, wherein the second resin includes a silicone.

7. The composite structure of claim 1,
wherein at least one textile layer includes one or more fiber-rich regions, within which all of the inter-fiber pores have a pore diameter equal to or less than the pore diameter threshold, and one or more fiber-poor regions, within which some of the inter-fiber pores have a pore diameter equal to or less than the pore diameter threshold and some have a pore diameter greater than the pore diameter threshold; and
wherein the one or more fiber-rich regions are interspersed with the one or more fiber-poor regions.

8. The composite structure of claim 7, wherein the one or more fiber-rich regions and the one or more fiber-poor regions are interspersed in a pattern.

9. The composite structure of claim 7,
wherein the textile arrangement comprises two or more stacked textile layers each including one or more fiber-rich regions interspersed with one or more fiber-poor regions; and
wherein at least one fiber-rich region of at least one textile layer is superposed by one or more fiber-poor regions of at least one other textile layer, in a direction substantially orthogonal to the layers.

10. The composite structure of claim 9, wherein the stacked textile layers are at least partially bonded to each other by the first and second resins.

11. The composite structure of claim 1, wherein a ratio of the pore diameters of inter-fiber pores having a diameter equal to or less than the pore diameter threshold to the pore diameters of inter-fiber pores having a diameter greater than the pore diameter threshold is approximately 1:10.

12. The composite structure of claim 1, wherein the pore diameter threshold is within a range of approximately 0.01 mm to 5.0 mm.

13. The composite structure of claim 12, wherein the pore diameter threshold is approximately 1.0 mm.

14. The composite structure of claim 12, wherein the pore diameter threshold corresponds to a wetting threshold of the textile fibers of at least one textile layer with the first resin.

15. A structural, exterior, or interior element of a vehicle, or part or portion thereof, formed of the composite structure of claim 1.

16. The element of claim 15, wherein the vehicle is an aircraft.

* * * * *